(12) United States Patent
Shao

(10) Patent No.: US 7,019,419 B2
(45) Date of Patent: Mar. 28, 2006

(54) PROTECTING A MOTHERBOARD FROM DAMAGE DUE TO INSTALLATION OF A HIGHER VOLTAGE CARD

(75) Inventor: Jung-Hui Shao, Taipei (TW)

(73) Assignee: Shuttle Inc., (TW)

( * ) Notice: Subject to any disclaimer, the term of this patent is extended or adjusted under 35 U.S.C. 154(b) by 91 days.

(21) Appl. No.: 10/413,436

(22) Filed: Apr. 11, 2003

(65) Prior Publication Data

US 2003/0218842 A1    Nov. 27, 2003

(30) Foreign Application Priority Data

Apr. 12, 2002  (TW) .............................. 091107426 A

(51) Int. Cl.
*H01H 3/26*  (2006.01)
(52) U.S. Cl. .................................... 307/140; 370/141.8
(58) Field of Classification Search ................ 713/340; 307/140, 141.8
See application file for complete search history.

(56) References Cited

U.S. PATENT DOCUMENTS

| 5,613,130 | A | * | 3/1997 | Teng et al. .................. 713/300 |
| 5,754,870 | A | * | 5/1998 | Pollard et al. |
| 6,181,118 | B1 | * | 1/2001 | Meehan et al. ............. 323/274 |
| 6,618,264 | B1 | * | 9/2003 | Megason et al. ........... 361/759 |

* cited by examiner

*Primary Examiner*—Robert L. Deberadinis
(74) *Attorney, Agent, or Firm*—Fenwick & West LLP

(57) ABSTRACT

A motherboard is protected from burning or other damage caused by installation of card of a higher voltage than that for which the motherboard is designed, such as the installation of an AGP 2× graphics card in a motherboard designed for an AGP 4× graphics card. In the AGP example, a detection circuit determines whether the installed card is an AGP 2× or an AGP 4× graphics card. First and second power controlling circuits that control delivery of the DC power to the motherboard are either opened or closed based on whether and what type of card is installed. A switch may also be provided to control the passing of DC power through the first and second power controlling circuits. An alert unit, such as a light or buzzer, may also be provided to indicate the installation of a higher voltage card.

14 Claims, 1 Drawing Sheet

PROTECTING A MOTHERBOARD FROM DAMAGE DUE TO INSTALLATION OF A HIGHER VOLTAGE CARD

CROSS REFERENCE TO RELATED APPLICATIONS

This application claims the right of priority based on Taiwan application serial no. 091107426, filed on Apr. 12, 2002, which is herein incorporated in its entirety by reference.

BACKGROUND

1. Field of the Invention

The present invention relates generally to protecting a motherboard, and more particularly, to preventing the burning or overheating of a motherboard due to the installation of a higher voltage card.

2. Background of the Invention

Motherboards commonly have an Accelerated Graphics Port (AGP) slot, which is a standard for a display adapter interface commonly used for fast communication between the motherboard of a computer and a graphics card. Since its inception, AGP has progressed in technology from 2× speed to 4× speed, and now to 8× speed. The working voltage of the AGP 2× graphics card is 3.3 Volts DC, while the working voltage of the AGP 4× graphics card is 1.5 Volts DC. However, the AGP slot does not have a physical connection interface that distinguishes between 2× and 4× cards, so it does not protect against inserting an AGP card into the wrong slot. Hence, if a user plugs an AGP 2× graphics card into an AGP slot and then powers on the computer, the 3.3 Volts of DC power of the AGP 2× graphic card will enter into the chipset of the motherboard, whose working voltage is 1.5 Volts, via the AGP slot. The result may be to burn the motherboard and thus cause financial loss to the user.

Therefore, it is desirable to protect the chipset of a motherboard when a user plugs an AGP 2× graphics card into an AGP slot and powers on the computer.

SUMMARY OF THE INVENTION

Accordingly, the invention provides methods and apparati for protecting the motherboard of a computer when a higher voltage card (such as an AGP 2× graphics card) is installed in an associated slot for a computer motherboard having a chipset designed to support a lower voltage card also designed for that slot (such as an AGP 4× graphics card). Specifically, the computer is prevented from being powered on normally when the higher voltage card is installed in the slot, thereby preventing the chipset of the motherboard that supports the lower voltage card from being burned or otherwise damaged. In one embodiment, the slot is an AGP slot, the higher voltage card is an AGP 2× graphics card, and the motherboard is designed for an AGP 4× card.

In an embodiment of the invention, an apparatus is provided for preventing damage to a motherboard due to installation of a higher voltage card into a card slot on the motherboard designed for operation with lower voltage cards. A first power controlling circuit is coupled to coupled to control the passing of power to the motherboard. The first power controlling circuit is in communication with the card slot to receive a signal indicative of whether a card is installed in the card slot, wherein the first power controlling circuit is in the open circuit state when a card is installed and in the closed circuit state when a card is not installed. A detection circuit is also in communication with the card slot to receive a signal indicative of whether an inserted card is a higher voltage card, from which the detection circuit generates a control signal. A second power controlling circuit is further coupled to control the passing of power to the motherboard. The second power controlling circuit is in communication with the detection circuit to receive the control signal, responsive to which the second power controlling circuit is in the open circuit state when a higher voltage card is installed and in the closed circuit state when a lower voltage card is installed. Accordingly, the apparatus protects the motherboard when a higher voltage card is installed.

In another embodiment, a method is provided for preventing damage to a motherboard due to installation of a higher voltage card into a card slot on the motherboard designed for operation with lower voltage cards. The method comprises determining whether a card is installed in the card slot. If a card is installed in the card slot, a first power controlling circuit is put in an open circuit state whereby power cannot pass to the motherboard via the first power controlling circuit; otherwise, the first power controlling circuit is put in a closed circuit state whereby power can pass to the motherboard via the first power controlling circuit. The method further comprises detecting whether the card is a higher or a lower voltage card if a card is installed in the card slot. If the installed card is a higher voltage card, a second power controlling circuit is put in an open circuit state whereby power cannot pass to the motherboard via the second power controlling circuit; otherwise, the installed card is a lower voltage card, and the second power controlling circuit is put in a closed circuit state whereby power can pass to the motherboard via the second power controlling circuit. In this way, the motherboard is powered normally when a lower voltage card is installed, but is prevented from being damaged when a higher voltage card is installed.

In another embodiment, the slot is an AGP slot, the higher voltage card is an AGP 2× graphics card, and the motherboard is designed for an AGP 4× card. In an aspect of an embodiment, a user-accessible switch is coupled in series with the first and second power controlling circuits to controls power passing therethrough to the motherboard. In another aspect, an alert unit, such as a light or buzzer, is provided to indicate the installation of a higher voltage card.

The novel features of the invention are set forth with particularly in the appended claims. The invention is best understood from the following written description when read in conjunction with the accompanying drawings.

DETAILED DESCRIPTION OF THE PREFERRED EMBODIMENTS

Figure 1:
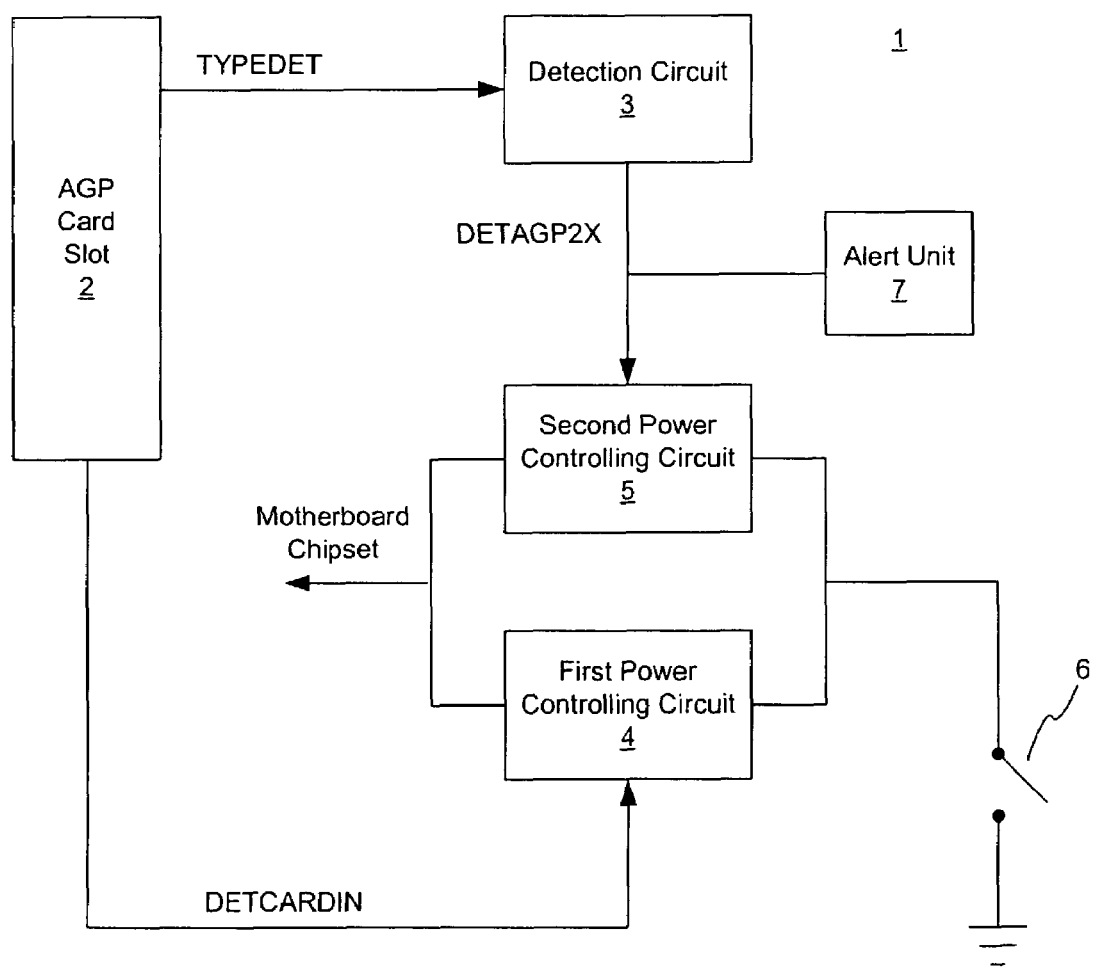
FIG. 1 is a block diagram of an apparatus for preventing a motherboard from burning in accordance with one embodiment of the invention.

FIG. 1 illustrates a schematic of an apparatus for preventing a motherboard from burning in accordance with an embodiment of the present invention. As shown in FIG. 1, the apparatus is positioned on a motherboard 1; however, it should be understood that the apparatus could be positioned off the motherboard if desired. Coupled to the motherboard 1 is a slot 2 for receiving a card (not shown). The card can be a higher voltage or a lower voltage card (with respect to each other), and the slot 2 is capable of receiving either the higher or lower voltage type of card. This invention is described herein in the context of the Accelerated Graphics Port (AGP), wherein the slot 2 is an AGP slot, and the higher and lower voltage cards are AGP 2× and AGP 4× graphics cards, respectively. However, it can be readily understood that the invention can be applied to protect motherboards from damage from installation of other types of graphics and non-graphics cards that are plugged into their respective slots on a motherboard.

AGP slot 2 is configured to output a TYPEDET signal and a DETCARDIN signal. The TYPEDET signal indicates whether an AGP 2× graphics card is plugged into the AGP slot 2. The DETCARDIN signal indicates whether any card, an AGP 2× or 4× graphics card, is plugged into the AGP slot 2.

A detection circuit 3 is coupled to the AGP slot 2 to receive the TYPEDET signal therefrom. Using the TYPEDET signal, the detection circuit determines whether a card plugged in the AGP slot 2 is an AGP 2× graphics card or an AGP 4× graphics card. Based on this determination, the detection circuit 3 generates a DETAGP2× signal, which for example is logic high when the detection circuit 3 determines that the card is an AGP 2× card. In an embodiment, the detection circuit 3 is a transistor, such as a bipolar junction transistor. When an AGP 2× graphics card is plugged in the AGP slot 2, the TYPEDET signal is enabled and the detection circuit is turned on, which enables the DETAGP2× signal.

A first power controlling circuit 4 is coupled in communication with the AGP slot 2 for receiving the DETCARDIN signal therefrom. The first power controlling circuit 4 controls DC power to the chipset, and can be in the open circuit or in the closed circuit state. When any AGP graphics card is installed into the AGP slot 2, the DETCARDIN signal is enabled, which causes the first power controlling circuit 4 to be in the open circuit state. When no AGP graphics card is plugged into the AGP slot 2, the DETCARDIN signal is disabled, which causes the first power controlling circuit 4 to be in the close circuit state. In an embodiment, the first power controlling circuit 4 comprises a Field Effect Transistor FET.

A second power controlling circuit 5 is coupled in communication with the detection circuit 3 for receiving the DETAGP2× signal therefrom. The second power controlling circuit 5 also controls DC power to the chipset, and can be in the open circuit or in the closed circuit state. When the DETAGP2× signal is enabled, the second power controlling circuit 5 is in the open circuit state, and when the DETAGP2× signal is disabled, the second power controlling circuit 5 is in the close circuit state. Like the first power controlling circuit 4, the second power controlling circuit 5 may comprise a FET.

In one embodiment, the apparatus also includes a switch 6 in series with the first and second power controlling circuits 4,5. The switch 6 may be activated by a button (not shown) or other user accessible means for controlling the state of the switch. When the switch 6 is opened, the system is forced in the open circuit state, preventing power conduction. Closing the switch 6 allows DC power to be provided to the chipset depending on the status of the first and second power controlling circuits 4,5. Effectively, the switch 6 allows a user to manually override the apparatus.

In another embodiment, an alert unit 7 is provided to alert the user of the installation of a higher voltage AGP 2× card. The alert unit may use the DETAGP2× signal to determine the presence of the AGP 2× graphics card. The alert unit 7 may comprise a light, a buzzer, or any other type of or combination of indicators suitable for alerting a user to the presence of an AGP 2× graphics card.

Now taking an example to explain the operation of an embodiment of the invention, the DETCARDIN signal is disabled when there is no AGP graphics card plugged into the AGP slot 2; hence, the first power controlling circuit 4 is in the closed circuit state. Furthermore, the TYPEDET is disabled, which turns off the detection circuit 3 and disables the DETAGP2× signal. The second power controlling circuit 5, controlled by the DETAGP2× signal, is thus in the closed circuit state. Accordingly, when there is no AGP graphics card in the AGP slot 2, the DC power is provided to the chipset via the first power controlling circuit 4.

When an AGP 4× graphics card is plugged into the AGP slot 2, the DETCARDIN signal is enabled, which makes the first power controlling circuit 4 an open circuit. In addition, the TYPEDET signal is disabled, which turns off the detection circuit 3 and thus disables the DETAGP2× signal. This, in turn, puts the second power controlling circuit 5 in the closed circuit state. Accordingly, when there is an AGP 4× graphics card in the AGP slot 2, the DC power is provided to the chipset via the second power controlling circuit 5. This allows for normal operation of the computer.

When an AGP 2× graphics card is plugged in the AGP slot 2, the DETCARDIN signal is enabled, which makes the first power controlling circuit 4 an open circuit. In addition, the TYPEDET signal is enabled, which turns on the detection circuit 3 and thus enables the DETAGP2× signal. This, in turn, puts the second power controlling circuit 5 in the open circuit state. Accordingly, when there is an AGP 2× graphics card in the AGP slot 2, the DC power is not provided to the chipset via either the first power controlling circuit 4 or the second power controlling circuit 5. This prevents burning of or other damage to the motherboard 1, which is not designed to operate with the higher voltage AGP 2× card.

The table below summarizes the operation of the embodiment of the apparatus described above.

| Card Slot Status | TYPDET | DETAGP2X | DETCARDIN | First Power Controlling Circuit | Second Power Controlling Circuit |
| --- | --- | --- | --- | --- | --- |
| no card | 0 | 0 | 0 | closed | closed |
| AGP 4x | 0 | 0 | 1 | open | closed |
| AGP 2x | 1 | 1 | 1 | open | open |

The apparatus thus prevents DC power passing to the chipset on the motherboard when a higher voltage AGP 2× graphics card is installed so as to protect the chipset from damage due to the excessive voltage. However, the apparatus allows for DC power to pass through to the motherboard when an AGP 4× graphics card is installed, allowing for normal operation of the computer.

The foregoing description of the embodiments of the invention has been presented for the purposes of illustration and description. It is not intended to be exhaustive or to limit the invention to the precise forms disclosed. Persons skilled in the relevant art can appreciate that many modifications and variations are possible in light of the above teaching. It is therefore intended that the scope of the invention be limited not by this detailed description, but rather by the claims appended hereto.

I claim:

1. An apparatus for preventing damage to a motherboard due to installation of a higher voltage card into a card slot on the motherboard designed for operation with lower voltage cards, the apparatus comprising:
   a first power controlling circuit coupled to allow power to pass to the motherboard in a closed circuit state and further to disallow power to pass to the motherboard in an open circuit state, the first power controlling circuit in communication with the card slot to receive a signal indicative of whether a card is installed in the card slot, wherein the first power controlling circuit is in the open circuit state when a card is installed and in the closed circuit state when a card is not installed;
   a detection circuit in communication with the card slot to receive a signal indicative of whether an inserted card is a higher voltage card, from which the detection circuit generates a control signal; and
   a second power controlling circuit coupled to allow power to pass to the motherboard in a closed circuit state and further to disallow power to pass to the motherboard in an open circuit state, the second power controlling circuit in communication with the detection circuit to receive the control signal, responsive to which the second power controlling circuit is in the open circuit state when a higher voltage card is installed and in the closed circuit state when a lower voltage card is installed.

2. The apparatus of claim 1, further comprising:
   a user-accessible switch coupled in series with the first power controlling circuit and the second power controlling circuit, wherein the switch controls power passing through the first power controlling circuit and said second power controlling circuit to the motherboard.

3. The apparatus of claim 1, further comprising:
   an alert unit for communicating to a user a message indicating when a higher voltage card is installed in the card slot.

4. The apparatus of claim 1, wherein the detection circuit comprises a transistor.

5. The apparatus of claim 1, wherein each of the first power controlling circuit and the second power controlling circuit comprises a field effect transistor (FET).

6. A protection circuit for preventing damage to a motherboard when an AGP 2× graphics card is installed into an AGP slot on a motherboard designed for an AGP 4× graphics card, the AGP slot generating a TYPEDET signal indicative of a type of card installed therein and a DETCARDIN signal indicative of whether any card is installed therein, the protection circuit comprising:
   a detection circuit, coupled to the AGP slot for determining whether a card installed in the AGP slot is an AGP 2× graphics card or an AGP 4× graphics card according to the TYPEDET signal, the detection circuit generating a DETAGP2× signal when detecting an AGP 2× card;
   a first power controlling circuit coupled to the AGP slot and for controlling power to the motherboard, the first power controlling circuit being in an open circuit state when the DETCARDIN signal indicates the installation of a card, and being in a close circuit state when the DETCARDIN indicates no installation of a card; and
   a second power controlling circuit coupled to the AGP slot and for controlling power to the motherboard, the second power controlling circuit being in an open circuit state when the DETAGP2× signal indicates the installation of an AGP 2× graphics card, and being in a close circuit state when the DETCARDIN indicates the installation of an AGP 4× graphics card.

7. The protection circuit of claim 6, further comprising:
   a user-accessible switch coupled in series with the first power controlling circuit and the second power controlling circuit, wherein the switch controls power passing through the first power controlling circuit and said second power controlling circuit to the motherboard.

8. The protection circuit of claim 6, further comprising:
   an alert unit for communicating to a user a message indicating when a higher voltage card is installed in the card slot.

9. The protection circuit of claim 6, wherein the detection circuit comprises a transistor.

10. The protection circuit of claim 6, wherein each of the first power controlling circuit and the second power controlling circuit comprises a field effect transistor (FET).

11. A method for preventing damage to a motherboard due to installation of a higher voltage card into a card slot on the motherboard designed for operation with lower voltage cards, the method comprising:
   determining whether a card is installed in the card slot;
   if a card is installed in the card slot, causing a first power controlling circuit to be in an open circuit state whereby power cannot pass to the motherboard via the first power controlling circuit, otherwise causing the first power controlling circuit to be in a closed circuit state whereby power can pass to the motherboard via the first power controlling circuit;
   if a card is installed in the card slot, detecting whether the card is a higher or a lower voltage card; and
   if the installed card is a higher voltage card, causing a second power controlling circuit to be in an open circuit state whereby power cannot pass to the motherboard via the second power controlling circuit, otherwise if the installed card is a lower voltage card, causing the second power controlling circuit to be in a closed circuit state whereby power can pass to the motherboard via the second power controlling circuit,
   whereby the motherboard is powered normally when a lower voltage card is installed, but is prevented from being damaged when a higher voltage card is installed.

12. The method of claim 11, further comprising:
   responsive to the state of a user accessible switch, overriding the first and second power controlling circuits to disallow power to pass via the first or second power controlling circuits regardless of any card installed in the card slot.

13. The method of claim 11, further comprising:
   responsive to the installation of a higher voltage card in the card slot, providing an observable alert.

14. The method of claim 11, wherein the card slot is an AGP card slot, the lower voltage card is an AGP 4× graphics card, and the higher voltage card is an AGP 2× graphics card.

* * * * *